United States Patent
Wang (10) Patent No.: US 9,921,611 B2
(45) Date of Patent: Mar. 20, 2018

(54) ELECTRONIC DEVICE AND FLEXIBLE CONNECTION DEVICE

(71) Applicants: Beijing Lenovo Software Ltd., Beijing (CN); Lenovo (Beijing) Limited, Beijing (CN)

(72) Inventor: Lijun Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 253 days.

(21) Appl. No.: 14/929,854

(22) Filed: Nov. 2, 2015

(65) Prior Publication Data

US 2017/0023987 A1    Jan. 26, 2017

(30) Foreign Application Priority Data

Jul. 20, 2015    (CN) .......................... 2015 1 0428941

(51) Int. Cl.
*E05D 15/00*    (2006.01)
*E05D 3/06*    (2006.01)
(Continued)

(52) U.S. Cl.
CPC .......... *G06F 1/1681* (2013.01); *G06F 1/1616* (2013.01); *E05Y 2900/606* (2013.01)

(58) Field of Classification Search
CPC .... G06F 1/1681; G06F 1/1616; G06F 1/1652; E05Y 2900/606; E05D 3/06;
(Continued)

(56) References Cited

U.S. PATENT DOCUMENTS

| 9,684,343 B2 * | 6/2017 | Tazbaz ................. G06F 1/1637 |
| 2010/0141005 A1 | 6/2010 | MacKert |

(Continued)

FOREIGN PATENT DOCUMENTS

| CN | 101840247 A | 9/2010 |
| CN | 103161819 A | 9/2013 |

(Continued)

OTHER PUBLICATIONS

"Chinese Application No. 201510428941.X, Office Action dated May 3, 2017", w/ English Translation, (dated May 3, 2017), 12 pgs.

*Primary Examiner* — Robert Sandy
*Assistant Examiner* — Matthew J Sullivan
(74) *Attorney, Agent, or Firm* — Schwegman Lundberg & Woessner, P.A.

(57) ABSTRACT

An embodiment of the present disclosure provides an electronic device and a flexible connection device. The electronic device comprises a first body; a second body; and a flexible connection device, configured to connect the first body and the second body. The flexible connection device comprises N shafts; and N−1 transmission structures, wherein each of the transmission structures connects two adjacent shafts, to connect the N shafts together in order, wherein N is an integer which is larger than 3 or equals to 3. When an action force is applied onto the first body and/or the second body so that relative positions of the first body and the second body are changed, the N shafts and the N−1 transmission structures are driven sequentially so that the flexible connection device is flexibly bent while keeping the length of the inner arc of the flexible connection device constant.

14 Claims, 5 Drawing Sheets

(51) Int. Cl.
*E05D 5/14* (2006.01)
*G06F 1/16* (2006.01)

(58) Field of Classification Search
CPC ......... Y10T 16/53824; Y10T 16/53832; Y10T 16/53833; Y10T 16/53864
See application file for complete search history.

(56) References Cited

U.S. PATENT DOCUMENTS

| | | | |
|---|---|---|---|
| 2013/0219663 A1* | 8/2013 | Cai | G06F 1/1681 |
| | | | 16/371 |
| 2014/0126121 A1 | 5/2014 | Griffin et al. | |
| 2016/0060931 A1* | 3/2016 | Zhang | E05D 3/12 |
| | | | 361/679.55 |
| 2016/0090763 A1* | 3/2016 | Hsu | E05D 3/06 |
| | | | 16/354 |
| 2016/0187934 A1* | 6/2016 | Lee | G06F 1/1618 |
| | | | 361/679.56 |
| 2016/0215541 A1* | 7/2016 | Tazbaz | E05D 3/14 |
| 2016/0370828 A1* | 12/2016 | Hsu | G06F 1/1652 |
| 2016/0370829 A1* | 12/2016 | Hsu | G06F 1/1652 |
| 2017/0061836 A1* | 3/2017 | Kim | G09F 9/301 |
| 2017/0094775 A1* | 3/2017 | Fan | G06F 1/1652 |
| 2017/0227993 A1* | 8/2017 | Holung | G06F 1/1681 |

FOREIGN PATENT DOCUMENTS

| | | |
|---|---|---|
| CN | 104279220 A | 1/2015 |
| CN | 204127102 U | 1/2015 |
| CN | 104464529 A | 3/2015 |

\* cited by examiner

ELECTRONIC DEVICE AND FLEXIBLE CONNECTION DEVICE

CROSS-REFERENCE TO RELATED APPLICATION

This application claims the benefit of Chinese Patent Application No. 201510428941.X filed on Jul. 20, 2015 entitled "An Electronic Device and A Flexible Connection Device" in the State Intellectual Property Office of China, the whole disclosure of which is incorporated herein by reference.

BACKGROUND

Field of the Disclosure

The present invention relates to a field of mechanical technique, and in particular to an electronic device and a flexible connecting device.

Description of the Related Art

Along with the development of science and technology, electronic technique is also developed quickly. Thus, more and more kinds of electronic products have appeared and the people can enjoy various conveniences which the technical development brings about. Nowadays, a person can enjoy a comfortable life which is brought about as the technique develops, with various types of electronic devices.

In the prior art, some electronic devices each includes at least two bodies. For example, a notebook computer includes a display body and a keyboard body connected via a shaft. A user can open it in use, while he can close it when being carried.

However, the existing electronic device has two bodies which are not able to be flexibly bent. After being folded, it cannot present an integral appearance.

SUMMARY OF THE DISCLOSURE

An embodiment of the present invention provides an electronic device and a flexible connection device, for achieving the technical effect of flexibly bending of the electronic device, while keeping the length of inner arc of the flexible connection device not changed.

According to one aspect, the present invention provides an electronic device, comprising:
 a first body;
 a second body;
 a flexible connection device, configured to connect the first body and the second body, and comprising:
  N shafts;
  N−1 transmission structures, wherein each of the transmission structures connects two adjacent shafts, to connect the N shafts together in order, wherein N is an integer which is larger than 3 or equals to 3;
  when an action force is applied onto the first body and/or the second body so that relative positions of the first body and the second body are changed, the N shafts and the N−1 transmission structures are driven sequentially so that the flexible connection device is flexibly bent.

Alternatively, the transmission structure is provided with a first through hole and a second through hole;
 a first inner diameter of the first through hole is larger than a first outer diameter of the shaft, so that the shaft is rotatable in the first through hole;
 a second inner diameter of the second through hole is matched with the first outer diameter, so that the shaft is fixed in the second through hole;

the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, wherein i is an integer between 1 and N−1, and j is an integer between 1 and N−2.

Alternatively, the transmission structure comprises a first sub-fixing point and a second sub-fixing point, provided on a first surface of the transmission structure;
 the first sub-fixing point and the second sub-fixing point are used to connect and fix the two transmission structures provided to surround the same shaft, so that the shaft rotates with the first sub-fixing point and the second sub-fixing point as a rotating center.

Specifically, the step of rotating the shaft with the first sub-fixing point and the second sub-fixing point as the rotating center comprises:
 connecting the first sub-fixing point of the $j^{th}$ transmission structure with the second sub-fixing point of the $j-1^{th}$ transmission structure, and thus connecting the $j^{th}$ transmission structure and the $j-1^{th}$ transmission structure;
 connecting the first sub-fixing point of the $j+1^{th}$ transmission structure with the second sub-fixing point of the $j^{th}$ transmission structure, and thus connecting the $j^{th}$ transmission structure and the $j+1^{th}$ transmission structure, wherein j is an integer between 2 and N−2.

Alternatively, a first side portion of the transmission structure is provided with a first connection portion, and a second side portion of the transmission structure opposite to the first side portion is provided with a second connection portion, and
 the two transmission structures provided to surround the adjacent shafts respectively are rotatably connected by means of the first connection portion and the second connection portion.

Specifically, the step of rotatably connecting the two transmission structures provided to surround the adjacent shafts respectively by means of the first connection portion and the second connection portion comprises:
 rotatably connecting the first connection portion of the $j^{th}$ transmission structure with the second connection portion of the $j-2^{th}$ transmission structure, and
 rotatably connecting the second connection portion of the $j^{th}$ transmission structure with the first connection portion of the j+2th transmission structure, wherein j is an integer between 3 and N−3.

Alternatively, the flexible connection device further comprises N/2 holding structures, each of which comprises a first clamping portion and a second clamping portion;
 the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

Alternatively, the flexible connection device further includes:
 a first body connection structure, configured to connect the first body and one of the first shaft and the $N^{th}$ shaft; and
 a second body connection structure, configured to connect the second body and the other one of the first shaft and the $N^{th}$ shaft.

According to another aspect, the present invention provides a flexible connection device, comprising:
 N shafts;
 N−1 transmission structures, wherein each of the transmission structures connects two adjacent shafts, to connect the N shafts together in order, wherein N is an integer which is larger than 3 or equals to 3;

when an action force is applied onto a first body and/or a second body connected by the flexible connection device so that relative positions of the first body and the second body are changed, the N shafts and the N−1 transmission structures are driven sequentially so that the flexible connection device is flexibly bent.

Alternatively, the transmission structure is provided with a first through hole and a second through hole;

a first inner diameter of the first through hole is larger than a first outer diameter of the shaft, so that the shaft is rotatable in the first through hole;

a second inner diameter of the second through hole is matched with the first outer diameter, so that the shaft is fixed in the second through hole;

the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, wherein i is an integer between 1 and N−1, and j is as an integer between 1 and N−2.

Alternatively, the transmission structure comprises a first sub-fixing point and a second sub-fixing point, provided on a first surface of the transmission structure;

the first sub-fixing point and the second sub-fixing point are used to connect and fix the two transmission structures provided to surround the same shaft, so that the shaft rotates with the first sub-fixing point and the second sub-fixing point as a rotating center.

Specifically, the step of rotating the shaft with the first sub-fixing point and the second sub-fixing point as the rotating center comprises:

connecting the first sub-fixing point of the $j^{th}$ transmission structure with the second sub-fixing point of the $j-1^{th}$ transmission structure, and thus connecting the $j^{th}$ transmission structure and the $j-1^{th}$ transmission structure;

connecting the first sub-fixing point of the $j+1^{th}$ transmission structure with the second sub-fixing point of the $j^{th}$ transmission structure, and thus connecting the $j^{th}$ transmission structure and the $j+1^{th}$ transmission structure, wherein j is an integer between 2 and N−2.

Alternatively, a first side portion of the transmission structure is provided with a first connection portion, and a second side portion of the transmission structure opposite to the first side portion is provided with a second connection portion, and the two transmission structures provided to surround the adjacent shafts respectively are rotatably connected by means of the first connection portion and the second connection portion.

Specifically, the step of rotatably connecting the two transmission structures provided to surround the adjacent shafts respectively by means of the first connection portion and the second connection portion comprises:

rotatably connecting the first connection portion of the $j^{th}$ transmission structure with the second connection portion of the $j-2^{th}$ transmission structure, and rotatably connecting the second connection portion of the $j^{th}$ transmission structure with the first connection portion of the j+2th transmission structure, wherein j is an integer between 3 and N−3.

Alternatively, the flexible connection device further comprises N/2 holding structures, each of which comprises a first clamping portion and a second clamping portion;

the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

Alternatively, the flexible connection device further includes:

a first body connection structure, configured to connect the first body and one of the first shaft and the $N^{th}$ shaft; and a second body connection structure, configured to connect the second body and the other one of the first shaft and the $N^{th}$ shaft.

DETAILED DESCRIPTION OF THE PREFERRED EMBODIMENTS

An embodiment of the present invention provides an electronic device and a flexible connection device, in order to solve the technical problem in the prior art that the two bodies cannot be flexibly bent and after being folded they cannot present an integral appearance. Furthermore, the embodiment of the present invention can obtain the technical effect that the electronic device is flexibly bent while achieving a length of inner arc in the flexible connection device to be constant.

In order to solve the above mentioned technical problem, the general concept of the technical solutions in accordance with the present invention is as follows:

In a technical solution of the present invention, an electronic device includes a first body and a second body; a flexible connection device, configured to connect the first and second bodies, and include N shafts and N−1 transmission structures, wherein each of the transmission structures is used to connect the two adjacent shafts, so as to join the N shafts together in order, wherein N is an integer which is larger than or equals to 3; when an action force is applied onto the first body and/or the second body so that the positions of the first and second bodies are changed with respect to each other, the N shafts and the N−1 transmission structures move with respect to each other or are driven sequentially so as to flexibly bend the flexible connection device. Therefore, in an embodiment of the present invention, the flexible connection device includes the N shafts and the N−1 transmission structures, and each of the transmission structures connects two adjacent shafts and in turn they connect all the N shafts together in order. Because the N shafts of the flexible connection device are connected in order, and the flexible connection device in turn connects the first and second bodies; when the action force is applied onto the first body and/or the second body to change the positions of the first and second bodies with respect to each other, the action force will be transmitted among the N shafts and the N−1 transmission structures, so that the N shafts will be rotated and the flexible connection device will gradually flexibly bend. Therefore, from a viewpoint of an appearance of the electronic device, the user can observe the flexible bending of the electronic device, and cannot observe two apparent bodies. After being flexibly bent, the electronic device still keeps the integral appearance. Furthermore, during the bending, the length of the inner arc of the flexible connection device will be kept not changed.

The technical solutions of the present invention will be discussed in detail with reference to the drawings in conjunction with specific examples. It should be understood that the specific embodiments of the present invention and specific features of the embodiment are intended to describe the technical solution of the present invention in detail, rather than limiting them. In the case that they are not conflicted with each other, the embodiments of the present invention and the specific features of the embodiment can be combined each other.

In this text, the term "and/or" is only a correlated relationship for describing correlated objects, and means that it can have three relationships. For example, A and/or B can indicate three situations of: only A, both of A and B, and only B. In addition, the character "/" therein generally indicates an "or" relationship of the former and latter correlated objects.

Figure 1:
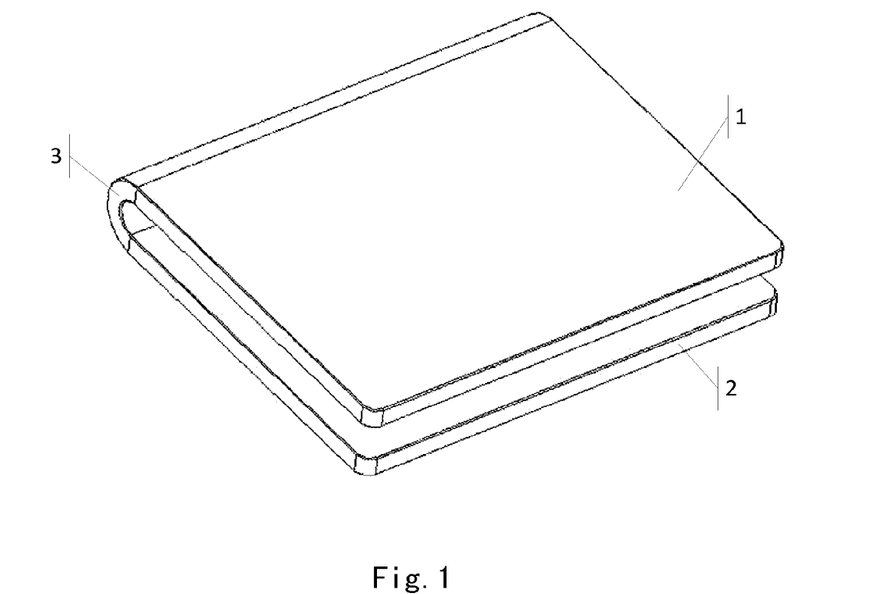
FIG. 1 is a schematic view showing an appearance of an electronic device in an embodiment of the present invention.
Figure 2:
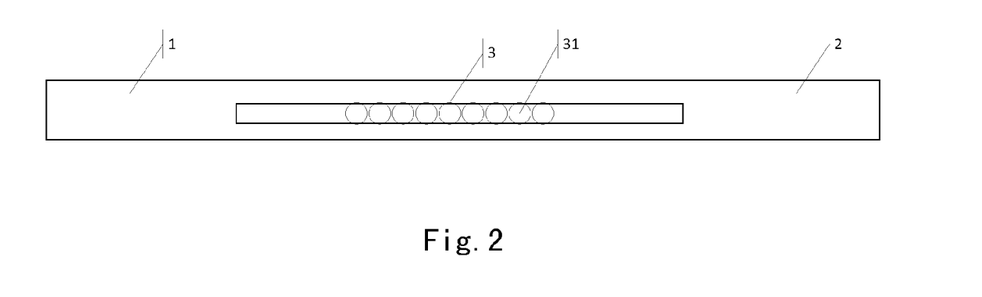
FIG. 2 is a schematic sectional view of the electronic device in the embodiment of the present invention with a flexible connection device being not bent.
Figure 3:
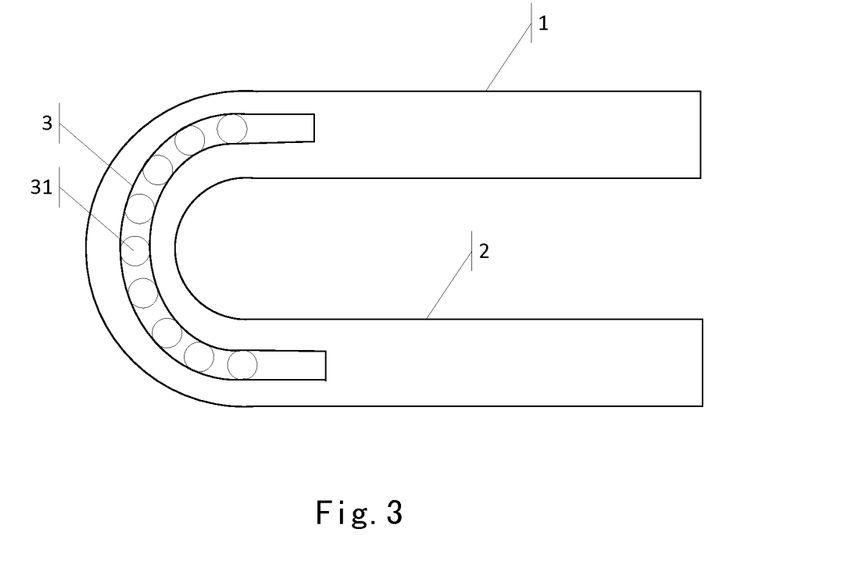
FIG. 3 is a schematic sectional view of the electronic device in the embodiment of the present invention with the flexible connection device being bent.

A first aspect of the present invention provides an electronic device, and please refers to FIGS. 1-3. This electronic device includes two bodies, i.e., a first body 1 and a second body 2 connected by a flexible connection device 3. The flexible connection device 3 is bendable, as shown in FIG. 3 and can be in a non-curved shape, as shown in FIG. 2.

In the embodiment of the present invention, the first body 1 and the second body 2 can be two separate bodies, for example, in a case that the electronic device is a notebook computer, the first body 1 is a display body provided with a display screen and the second body 2 is a keyboard body provided with a keyboard. After being connected by the flexible connection device 3, the display body and the keyboard body of the notebook computer can be flexibly bent. Moreover, after the two bodies are folded to become in a carrying mode, they would not apparently present two bodies like the notebook computer in the prior art.

In addition, the first body 1 and the second body 2 in the present embodiment can also be one same body, for example, the electronic device is a flat panel computer in which the display screen is a flexible screen. The flexible connection device 3 is disposed within the flat panel computer, and thus two portions at two sides of the flexible connection device 3 correspond to the first body 1 and the second body 2. When the flexible screen is bent, the flexible connection device 3 can enable the body portions at two sides to bend at the same, finally the flat panel computer is flexibly bent in whole. In the specific implantation, the skilled person in the art related to the present invention can set the first body 1 and the second body 2 as actually required, while the present invention does not make any particular limitation to this.

The flexible connection device 3 is continually described below. Please refer to FIGS. 4-6, and the flexible connection device 3 includes N shafts 31, and N−1 transmission structures 32, wherein each of the transmission structure 32 connects two adjacent shafts 31. Specifically, a first transmission structure 32 connects a first shaft 31 and a second shaft 31, a second transmission structure 32 connects the second shaft 31 and a third shaft 31, a third transmission structure 32 connects the third shaft 31 and a fourth shaft 31 . . . , then the N shafts 31 are joined together in order by means of the N−1 transmission structures 32.

In the present embodiment, N is an integer which is larger than 3 or equals to 3, for example, 3, 4, 7, 9 or the like. The person skilled in the art can set this according to the actual condition, and the present invention does not make any particular limitation to this.

Figure 5:
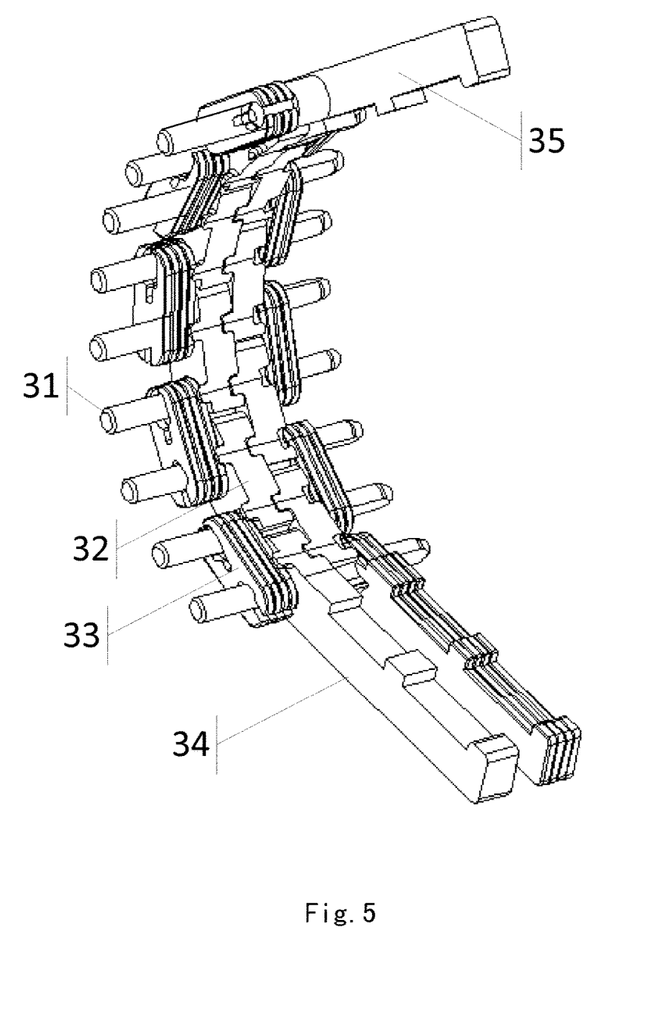
FIG. 5 is a schematic view showing a structure of the flexible connection device of FIG. 3.

For sake of description, the shaft 31 closest to the first body 1 is designated as the first shaft, and the shaft 31 closest to the second body 2 is designated as the $N^{th}$ shaft. In a direction from the first body 1 toward the second body 2, the order of the N shafts is: the first shaft, the second shaft, . . . , the $N^{th}$ shaft. When an action force for changing the relative positions of the two bodies is applied onto the first body 1, the first shaft 31 will be rotated. Under the transmission among the N shafts 31 and the N−1 transmission structures 32, the action force is transmitted from the first shaft 31 to the first transmission structure 32, and drives the first transmission structure 32 to rotate. In turn, the first transmission structure 32 transmits the action force to the second shaft 31, and drives the second shaft 31 to rotate. The second shaft 31 again drives the second transmission structure 32 to move, so that the action force is transmitted to the third shaft 31 by the second transmission structure 32, and drives the third shaft 31 to rotate. In a similar way, in the order from the first shaft 31 to the $N^{th}$ shaft 31, the N shafts 31 will rotate, and then the flexible connection device 3 will be flexibly bent, as shown in FIGS. 3 and 5.

Similarly, when the action force is applied onto the second body 2, in the order from the $N^{th}$ shaft 31 to the first shaft 31, the N shafts will rotate, so that the flexible connection device 3 will be flexibly bent. When the action force is applied on both of the first and second bodies 1 and 2, such rotation as described above will happen from the first shaft 31 and from the $N^{th}$ shaft 31 to the middle part thereof, for example the first shaft 31 drives the second shaft to rotate, and the $N^{th}$ shaft 31 drives the $N−1^{th}$ shaft 31 to rotate, similarly and finally the flexible connection device 3 is flexibly bent, as shown in FIGS. 3 and 5.

In the present embodiment, each shaft 31 has the same structure, and each transmission structure 31 also has the same structure. Therefore, taking any shaft 31 and any transmission structure 32 as one example, the specific structures of the shaft 31 and the transmission structure 32 are discussed below.

Figure 7:
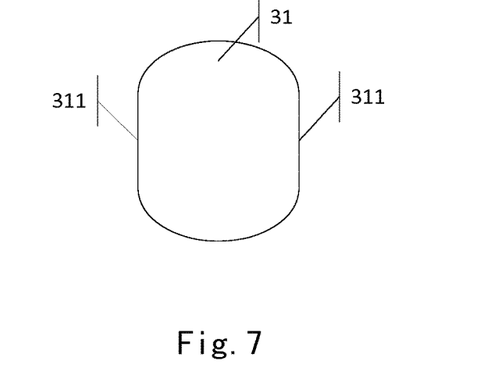
FIG. 7 is a schematic sectional view of a shaft in an embodiment of the present invention.

Firstly, the shaft 31 is described with reference to FIG. 7, which is a schematic sectional view of the shaft 31 in the embodiment of the present invention. The shaft 31 in the embodiment of the present invention includes two positioning pins 311. When the arc-shaped outer surface of the shaft 31 contacts the transmission structure 32, the shaft 31 rotates; when the positioning pin 311 contacts the transmission structure 32, the shaft 31 cannot rotate since the positioning pin 311 is planar.

A central angle which faces to a segment of arc-shaped outer surface of the shaft 31, means an angle within which the shaft 31 can rotate on this segment of arc-shaped outer surface. The two positioning pins 311 cause the shaft 31 only to rotate over a certain angle in two directions, i.e., clockwise direction and anti-clockwise direction, which is a corresponding angle with which the arc-shaped outer surface is rotated. In the embodiment of the present invention, each shaft 31 has two segments of symmetrical arc-shaped outer surfaces, each segment corresponds to a central angle of 10° to 15°, and the shaft 31 can in turn rotate at an angle of 10° to 15° in clockwise and anticlockwise direction respectively.

The transmission structure 32 is described below with reference to FIGS. 8 and 9, which are schematic sectional and structural views of the transmission structure 32. Firstly, in order join the two adjacent shafts 31, a first through hole 321 and a second through hole 322 are provided on the transmission structure 32, wherein the first through hole 321 has a first inner diameter larger than a first outer diameter of the shaft 31, so that the shaft 31 can rotate within the first through hole 321. In the present embodiment, the first through hole 321 is not completely circular. The second through hole 322 has a second inner diameter matched with the first outer diameter. The shaft 31 can pass through the second through hole 322 but is fixed within the second through hole 322 and cannot rotate. When setting the first inner diameter, the second inner diameter and the first outer diameter, the person skilled in the art can set them as actually required, as long as the shaft 31 can rotate within the first through hole 321 and is fixed within the second through hole 322. The present invention does not make any particular on this matter.

Because the first inner diameter is larger than the first outer diameter and the second inner diameter matches with the first outer diameter, the shaft 31 passing through the first through hole 321 can rotate with respect to the transmission structure 32. The shaft 31 passing through the second through hole 322 cannot rotate with respect to the transmission structure 32 and the transmission structure 32 is fixed with respect to the shaft 31 passing through the second through hole 322. Furthermore, if the shaft 31 in the second through hole 322 is to be rotated, then it will drive the transmission structure to rotate along with the shaft 31 together.

Figure 4:
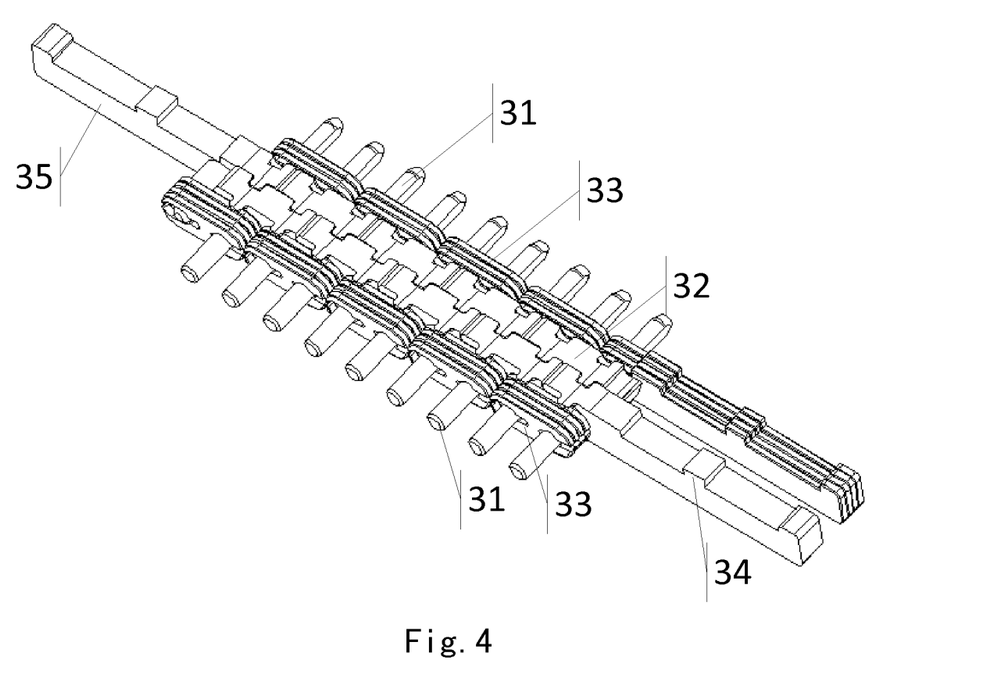
FIG. 4 is a schematic view showing a structure of the flexible connection device of FIG. 2.
Figure 6:
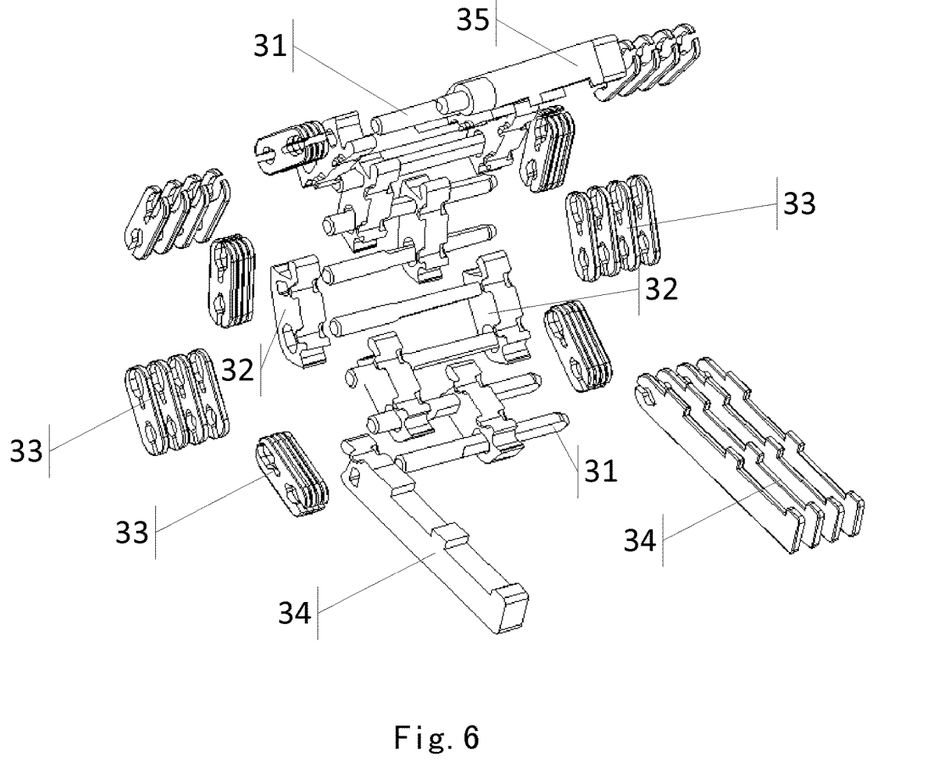
FIG. 6 is a schematic exploded view of the flexible connection device in FIG. 5.

With reference to FIGS. 4-6, the connection between the transmission structure 32 and the shaft 31 will be specifically described next.

In an example, j is an integer between 1 and N−1, and i is an integer between 1 and N. The second through hole 322 of j−$1^{th}$ transmission structure is provided to surround the $i^{th}$ shaft 31, meanwhile, the first through hole 321 of $j^{th}$ transmission structure is also provided to surround the $i^{th}$ shaft 31. Therefore, the $i^{th}$ shaft 31 is surrounded by two transmission structures 32, and then the $i^{th}$ shaft 31 can rotate with respect to the $j^{th}$ transmission structure 32 and cannot rotate with respect to the j−$1^{th}$ transmission structure 32.

Further, the second through hole 322 of the $j^{th}$ transmission structure 32 is provided to surround the i+$1^{th}$ shaft 31, whereas the first through hole 321 of the j+$1^{th}$ transmission structure 32 is provided to surround the i+$1^{th}$ shaft 31. In this way, the i+$1^{th}$ shaft 31 can rotate with respect to the j+$1^{th}$ transmission structure 32 and cannot rotate with respect to the $j^{th}$ transmission structure 32.

The remaining transmission structures 32 and the shafts 31 are similarly connected and thus they are not described in detail.

It can be seen from the above description about the transmission structure 32 and the shaft 31 that each transmission structure 32 connects two adjacent shafts 31, and each of the second shaft 31 to the N−$1^{th}$ shaft 31 is provided with two transmission structures 32. And the same shaft 31 therein can rotate with respect to one of the two transmission structures 32, while it cannot rotate with respect to the other one. Therefore, when the shaft 31 rotates, it will drive the transmission structure 32 provided to surround this shaft 31 through the second through hole 322. As such, when a transmission structure 32 rotates, it will also drive the shaft 31 which passes through the second through hole 322 of this transmission structure 32, to rotate. Thus, it can achieve the transmission of the action force from the shaft 31 to the transmission structure 32 or from the transmission structure 32 to the shaft 31. Subsequently, the shafts 31 rotate in a certain order, and the shafts 31 and the transmission structures 32 are driven sequentially, and rotate in order, so that the flexible connection device 3 is flexibly bent, as shown in FIG. 5.

Further, in order to connect and fix the transmission structure 32 and to ensure that during the bending, the length of the inner arc of the flexible connection device 3 is kept not changed, the transmission structure 32 further includes a first sub-fixing point 323 and a second sub-fixing point 324. Specifically, the first sub-fixing point 323 and the second sub-fixing point 324 are disposed onto a first surface of the transmission structure 32. The two sub-fixing points are used to connect and fix the two transmission structures 32 provided to surround the same shaft.

Specifically, the first sub-fixing point 323 of the $j^{th}$ transmission structure 32 is connected with the second sub-fixing point 324 of the j−$1^{th}$ transmission structure 32, and thus the $j^{th}$ transmission structure 32 and the j−$1^{th}$ transmission structure 32 provided to surround the $j^{th}$ shaft 31 are connected together. The first sub-fixing point 323 of the j+$1^{th}$ transmission structure 32 is connected with the second sub-fixing point 324 of the $j^{th}$ transmission structure 32, and thus the $j^{th}$ transmission structure 32 and the j+$1^{th}$ transmission structure 32 provided to surround the i+$1^{th}$ shaft 31 are connected together. Other transmission structures 32 are connected by the similar way as described above.

If the length of the inner arc of the flexible connection device 3 is virtually and equally divided into N−1 segments, then there are N virtual subdivision points on the length of the inner arc of the flexible connection device 3. During the flexibly bending, the N virtual subdivision points are fixedly positioned with respect to the electronic device. N shafts 31 are connected in order by the N−1 transmission structures 32, and each shaft 31 corresponds to one virtual subdivision point. In this way, the length of the corresponding inner arc between each two adjacent shafts 31 is kept constant, and further the length of the inner arc of the flexible connection device 3 is kept constant either. In the embodiment of the present invention, the positions where the N virtual subdivision points are located on the first surface of the transmission structure 32 are the positions where the first sub-fixing points 323 and the second sub-fixing points 324 are located on the first surface, as shown in FIG. 9.

When the action force is applied on the first body 1 and/or the second body 2 to change the relative positions of the two bodies, each shaft 31 is rotated around the first sub-fixing point 323 or the second sub-fixing point 324 of the two transmission structures 32 provided to surround the shaft 31 itself, as a rotating center. Further, the flexible connection device 3 is flexibly bent, as shown in FIG. 5.

Specifically, as shown in FIG. 4, at the initial time, the arc-shaped outer surface of the $i^{th}$ shaft 31 contacts the first through hole 321 of the $j^{th}$ transmission structure 32, and rotates therein. After the $i^{th}$ shaft 31 rotates by a certain angle, the positioning pin 311 of the $i^{th}$ shaft 31 contacts the first through hole 321 of the $j^{th}$ transmission structure 32, so the $i^{th}$ shaft 31 cannot continue to rotate within the first through hole 321 of the $j^{th}$ transmission structure 32. At this time, the $i^{th}$ shaft 31 will transmit the action force to the $j^{th}$ transmission structure 32 and thus the $j^{th}$ transmission structure 32 will be driven to move. Since the second through hole 322 of the $j^{th}$ transmission structure 32 is provided to surround the $i+1^{th}$ shaft 31, the $i+1^{th}$ shaft 31 will be driven by the $j^{th}$ transmission structure 32 to move, and rotate with the second sub-fixing point 324 of the $j^{th}$ transmission structure 32 as the rotating center. At this time, the $j^{th}$ transmission structure 32 will transmit the action force to the $i+1^{th}$ shaft 31.

Further, the $i+1^{th}$ shaft passes through the first through hole 321 of the $j+1^{th}$ transmission structure 32, and then when the $i+1^{th}$ shaft 31 is rotating, again rotates within the first through hole 321 of the $j+1^{th}$ transmission structure 32.

After the $i+1^{th}$ shaft 31 rotates in the first through hole 321 of the $j+1^{th}$ transmission structure 32 until the positioning pin 311 of the $i+1^{th}$ shaft 31 comes into contact with the first through hole 321 of the $j+1^{th}$ transmission structure 32, the $i+1^{th}$ shaft stops rotating and causes the $j-1^{th}$ transmission structure 32 to rotate. In this way, the $i+1^{th}$ shaft 31 will transmit the action force to the $j+1^{th}$ transmission structure 32, which will be driven to move.

Similarly, the $j+1^{th}$ transmission structure 32 drives the $i+2$th shaft 31 to rotate with the second sub-fixing point 324 of the $j+1^{th}$ transmission structure 32 and the first sub-fixing point 323 of the $j+2^{th}$ transmission structure 32 as the rotating center. Of course, at the same time, the $i+2^{th}$ shaft 31 rotates in the first through hole 321 of the $j+2^{th}$ transmission structure 32. The subsequent similar processes are not repeated to discuss and omitted herein for sake of clarity, and such processes are repeated until the $N^{th}$ shaft stops to rotate. As shown in FIG. 5, the flexible connection device 3 is bent.

It can be seen from the above description that each shaft corresponds to one sub-fixing point, and thus the distance between each pair of two adjacent shafts 31 corresponds to one of the equally divided lengths of the inner arcs of the flexible connection device 3. Each shaft 31 rotates with the sub-fixing points of two transmission structures 32, through which it passes, as the rotating center, and the relative positions of the sub-fixing points and the electronic device are kept not changed. In this way, it achieves the length of the corresponding inner arc between each pair of two adjacent shafts 31 to be constant, and the radian thereof is changed. Because the flexible connection device 3 includes N shafts 31, when N−1 equally divided segments of the constant length of the inner arc change their radians one by one in a certain order, the flexible connection device 3 will in whole obtain the flexible bending.

Figure 8:
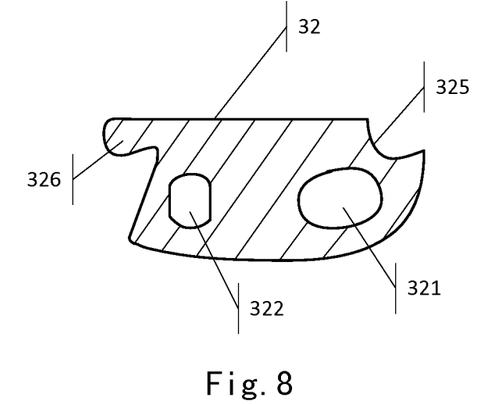
FIG. 8 is a schematic sectional view of a transmission structure in an embodiment of the present invention.
Figure 9:
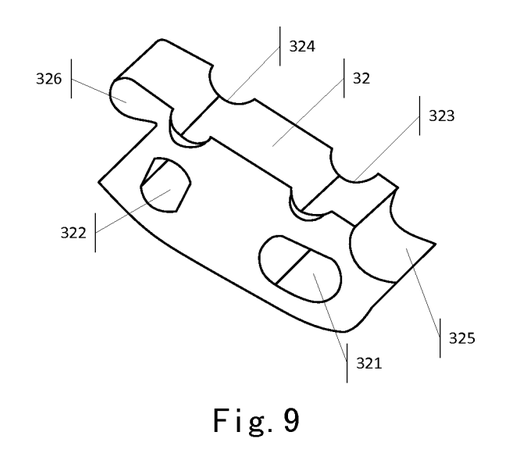
FIG. 9 is a schematic view showing a structure of the transmission structure in the embodiment of the present invention.

Alternatively, as shown in FIGS. 8 and 9, a first side portion of each transmission structure 32 is provided with a first connection portion 325, and a second side portion of the transmission structure 32 opposite to the first side portion is provided with a second connection portion 326. The first connection portion 325 and the second connection portion 326 are used to connect the two transmission structures 32 provided to surround the adjacent shafts 31. Specifically, the first connection portion 325 of the $j^{th}$ transmission structure 32 is connected with the second connection portion 326 of the $j-2^{th}$ transmission structure 32, and the second connection portion 326 of the $j^{th}$ transmission structure 32 is connected with the first connection portion 325 of the $j+2^{th}$ transmission structure 32.

A surface of the first connection portion 325 is fit to a surface of the second connection portion 326, so that the first connection portion 325 can rotate with respect to the second connection portion 326, and the connection between the first connection portion 325 and the second connection portion 326 is a rotatable connection.

Provided that the action force is applied onto the first body 1, when the $j-2^{th}$ transmission structure 32 is driven to move, the $j^{th}$ transmission structure 32 is not driven to move. Thus, a rotation occurs between the first connection portion 325 of the $j-2^{th}$ transmission structure 32 and the second connection portion 326 of the $j^{th}$ transmission structure 32. Meanwhile, the first connection portion 325 of the $j-2^{th}$ transmission structure 32 will generate a force having the same movement direction as that of the $j-2^{th}$ transmission structure 32 to the second connection portion 326 of the $j^{th}$ transmission structure 32, and further the $j^{th}$ transmission structure 32 is driven by the $i+1^{th}$ shaft 31 to move.

Furthermore, in the embodiment of the present invention, after the action force is withdrawn, the flexible connection device 3 keeps its curve which has been generated. In the present embodiment, the flexible connection device 3 further includes a holding structure 33. As shown in FIGS. 4-6, each holding structure 33 is configured to keep the two adjacent shafts to be fixed. Thus, N/2 holding structures 33 are provided in the flexible connection device 3.

Figure 10:
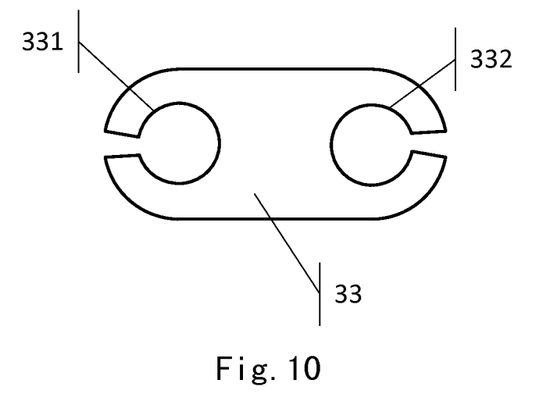
FIG. 10 is a schematic sectional view of a holding structure in an embodiment of the present invention.

Specifically, as shown in FIG. 10, the holding structure 33 includes a first clamping portion 331 and a second clamping portion 332.

Internal surfaces of the first clamping portion 331 and the second clamping portion 332 are fit to the shaft 31, so that in the case of no any action force, the shaft 31 can be clamped within the first clamping portion 331 or the second clamping portion 332, to be fixed therein and not to be rotatable. Specifically, y is an integer in the range of 1 to N/2, the first clamping portion 331 of the $y^{th}$ holding structure 33 clamps the $i^{th}$ shaft 31 and the second clamping portion 332 of the $y^{th}$ holding structure 33 clamps the $i-1^{th}$ shaft 31. As such, the first clamping portion 331 of the $y-1^{th}$ holding structure 33 clamps the $i-2^{th}$ shaft 31 and the second clamping portion 332 of the $y-1^{th}$ holding structure 33 clamps the $i-3^{th}$ shaft 31, . . . .

After the action force applied on the first body 1 and/or the second body 2 is removed, because the N shafts 31 are clamped by the N/2 holding structures 33 so as not to be rotatable, the flexibly bending of the flexible connection device 3 does not change, and the shape of the electronic device also does not change.

In specific implementation, when N is an odd number which is larger than 3 or equals to 3, if the N/2 is not an integer, then the number of the holding structures 33 can be forward rounded or backward rounded. For example, if N is 9, and N/2 is 4.5, then the number of the holding structure 33 can be set as 5 or 4. Preferably, the data of the holding structures 33 is backward rounded from N/2, and an additional holding structure 33 only including the first clamping portion 331 or the second clamping portion 332 is provided separately. The person skilled in the art can select it as actually required, and the present invention does not make any particular limitation to this.

In the embodiment of the present invention, the holding structure 33 can be a piece of metal elastic sheet. In order to enhance the friction between the holding structure 33 and the shaft 31, the holding structure 33 can also be a plurality of metal elastic sheets having the same structure, for example 3 or 4 metal elastic sheets. Alternatively, the holding structure 33 can also be made of material having a larger damping coefficient, for example rubber. The person skilled in the art can set it as actually required, and the present invention does not make any particular limitation to this.

Further, in order to increase the friction between the holding structure 33 and the shaft 31, as shown in FIGS. 4-6, the number of the holding structures 33 can be larger than N/2, and the present invention does not make any particular limitation to this.

In order to connect the flexible connection device 3 and the first body 1, and to connect the flexible connection 3 and the second body 2, the flexible connection device 3 also includes a first body connection structure 34 and a second body connection structure 35.

Specifically, the first body connection structure 34 is opened with a through hole through which the shaft 31 passes. A foremost shaft 31 only passes through one transmission structure 32. If the foremost shaft 31 passes through the first through hole 321 of the transmission structure 32, then the through hole of the first body connection structure 34 is set in the same manner as that of the second through hole 322, and thus the foremost shaft 31 is fixed within the through hole of the first body connection structure 34. Alternatively, If the foremost shaft 31 passes through the second through hole 322 of the transmission structure 32, then the through hole of the first body connection structure 34 is set in the same manner as that of the first through hole 321, and thus the foremost shaft 31 is rotatable within the through hole of the first body connection structure 34, thereby achieving the transmission of the action force between the first body 1 and the flexible connection device 3.

Further, the first body connection structure 34 further includes a part connected with the first body 1, through which the first body 1 and the first body connection structure 34 are connected mechanically, for example, cooperation of a screw and a nut. Further, the foremost shaft 31 and the first body are connected together, thereby achieving the connection of the flexible connection device 3 and the first body 1. The person skilled in the art can set it as actually required, and the present invention does not make any particular limitation to this.

The second body connection structure 35 is used to connect the last shaft 31 and the second body 2. The second body connection structure 35 is connected in the same manner as that of the first body connection structure 34, and thus the detailed description will be omitted herein.

The person skilled in the art should understand that the foremost shaft 31 and the last shaft 31 at mentioned in the previous four paragraphs are one shaft closest to the first body 1 and one shaft closest to the second body 2 respectively. In this way, if the foremost shaft 31 is the first shaft 31, and the last shaft is the $N^{th}$ shaft 31, whereas if the foremost shaft 31 is the $N^{th}$ shaft 31, then the last shaft is the first shaft 31. In the specific implementation, the present invention does not make any specific limitation to this.

On basis of the same inventive concept as that of the electronic device in accordance with the previous embodiments, a second aspect of the present invention also provides a flexible connection device, as shown in FIGS. 4-10, including:

N shafts 31, and N-1 transmission structures 32, wherein each of the transmission structure 32 connects two adjacent shafts 31 so as to connect the N shafts 31 together, as shown in FIGS. 4-6, wherein N is an integer which is larger than 3 or equals to 3.

When an action force is applied onto the first body 1 and/or the second body 2 connected by the flexible connection device 3 so that the relative positions of the first body 1 and the second body 2 are changed, the N shafts 31 and the N-1 transmission structures 32 are driven sequentially so that the flexible connection device is bent flexibly, as shown in FIG. 5.

Each of the transmission structures 32 is described below with reference to FIGS. 8 and 9.

A first through hole 321 and a second through hole 322 are provided on the transmission structure 32, wherein the first through hole 321 has a first inner diameter larger than a first outer diameter of the shaft 31, so that the shaft 31 can rotate within the first through hole 321. The second through hole 322 has a second inner diameter matched with the first outer diameter. The shaft 31 is fixed within the second through hole 322.

Further, the transmission structure 32 also includes a first sub-fixing point 323 and a second sub-fixing point 324 which are disposed on a first surface of the same transmission structure 32. The first sub-fixing point 323 and the second sub-fixing point 324 are used to connect and fix the two transmission structures 32 provided to surround the same shaft 31, so that the shaft 31 rotates with the first sub-fixing point 323 and the second sub-fixing point 324 as the rotating center. Specifically, the first sub-fixing point 323 of the $j^{th}$ transmission structure 32 is connected with the second sub-fixing point 324 of the $j-1^{th}$ transmission structure 32, and thus the $j^{th}$ transmission structure 32 and the $j-1^{th}$ transmission structure 32 are connected together. The first sub-fixing point 323 of the $j+1^{th}$ transmission structure 32 is connected with the second sub-fixing point 324 of the $j^{th}$ transmission structure 32, and thus the $j^{th}$ transmission structure 32 and the $j+1^{th}$ transmission structure 32 are connected together, wherein j is an integer between 2 and N-2.

Furthermore, a first side portion of the transmission structure 32 is provided with a first connection portion 325, and a second side portion of the transmission structure 32 opposite to the first side portion is provided with a second connection portion 326. The first connection portion 325 and the second connection portion 326 are used to rotatably connect the two transmission structures 32 provided to surround the adjacent shafts 31. Specifically, the first connection portion 325 of the $j^{th}$ transmission structure 32 is rotatably connected with the second connection portion 326 of the $j-2^{th}$ transmission structure 32, and the second connection portion 326 of the $j^{th}$ transmission structure 32 is rotatably connected with the first connection portion 325 of the $j+2^{th}$ transmission structure 32, wherein j is an integer between 3 and N-3.

In order to maintain the flexibly bending, the flexible connection device further includes N/2 holding structures 33. With reference to FIG. 10, each holding structure 33 includes a first clamping portion 331 and a second clamping portion 332. The first clamping portion 331 of the $y^{th}$ holding structure 33 clamps the $i^{th}$ shaft 31 and the second clamping portion 332 of the $y^{th}$ holding structure 33 clamps the $i-1^{th}$ shaft 31, wherein y is an integer in the range of 1 to N/2.

In addition, the flexible connection device also includes a first body connection structure 34 configured to connect the foremost shaft 31 to the first body 1; and a second body connection structure 35 configured to connect the last shaft 31 to the second body 2.

Various modifications and specific examples of the electronic devices as described in the above FIGS. 1-10 are also applicable to the flexible connection device of the present embodiment. The skilled person in the art can clearly know the implementing methods of the flexible connection device in the present embodiment, from the preceding detailed description of the electronic device. But for sake of clarity and concise of the specification, they are omitted herein.

One or more technical solutions of the embodiments in accordance with the present invention, at least has one or more of the following technical effects:

In the technical solution of the present invention, the electronic device includes a first body and a second body; and a flexible connection device configured to connect the first body and the second body. The flexible connection device includes: N shafts; and N−1 transmission structures, wherein each of the transmission structures is used to connect the two adjacent shafts, so as to join the N shafts together in order, wherein N is an integer which is larger than or equals to 3; when an action force is applied onto the first body and/or the second body so that the positions of the first and second bodies are changed with respect to each other, the N shafts and the N−1 transmission structures are driven sequentially so as to flexibly bend the flexible connection device. Therefore, in an embodiment of the present invention, the flexible connection device includes the N shafts and the N−1 transmission structures, and each of the transmission structures connects two adjacent shafts and they in turn connect all the N shafts together in order. Because the N shafts of the flexible connection device are connected in order, and the flexible connection device in turn connects the first and second bodies; when the action force is applied onto the first body and/or the second body to change the positions of the first and second bodies with respect to each other, the action force will be transmitted among the N shafts and the N−1 transmission structures, so that the N shafts will be rotated and the flexible connection device will gradually flexibly bend. Therefore, from a viewpoint of an appearance of the electronic device, the user can observe the flexible bending of the electronic device, and cannot observe two apparently separate bodies. After such flexible bending, the electronic device still keeps the integral appearance. Furthermore, during the bending, the length of the inner arc of the flexible connection device will be kept not changed.

It is apparent for those skilled in the art that various changes and modifications of the present invention can be made without departing from the spirit and scope of the present invention. Thus, if these changes and modifications of the present invention fall within the scope of claims and its equivalent techniques thereof, then the present invention is intended to encompass these changes and modifications.

What is claimed is:

1. An electronic device, comprising:
a first body;
a second body; and
a flexible connection device, configured to connect the first body and the second body, and comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto the first body and/or the second body so that relative positions of the first body and the second body are changed, the N shafts and the N−1 transmission structures are driven sequentially so that the flexible connection device is flexibly bent,
wherein the transmission structure is provided with a first through hole and a second through hole;
wherein a first inner diameter of the first through hole is larger than a first outer diameter of the shaft, so that the shaft is rotatable in the first through hole;
wherein a second inner diameter of the second through hole is matched with the first outer diameter, so that the shaft is fixed in the second through hole; and
wherein the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, wherein i is an integer between 1 and N−1, and j is an integer between 1 and N−2.

2. An electronic device, comprising:
a first body;
a second body; and
a flexible connection device, configured to connect the first body and the second body, and comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto the first body and/or the second body so that relative positions of the first body and the second body are changed, the N shafts and the N−1 transmission structures are driven sequentially so that the flexible connection device is flexibly bent, wherein the transmission structure is provided with a first through hole and a second through hole;
wherein a first inner diameter of the first through hole is larger than a first outer diameter of the shaft, so that the shaft is rotatable in the first through hole;
wherein a second inner diameter of the second through hole is matched with the first outer diameter, so that the shaft is fixed in the second through hole;
wherein the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, wherein i is an integer between 1 and N−1, and j is an integer between 1 and N−2, wherein the transmission structure further comprises a first sub-fixing point and a second sub-fixing point, provided on a first surface of the transmission structure;
and wherein the first sub-fixing point and the second sub-fixing point are used to connect and fix the two transmission structures provided to surround the same shaft, so that the shaft rotates with the first sub-fixing point and the second sub-fixing point as a rotating center.

3. The electronic device as claimed in claim 2, wherein a first side portion of the transmission structure is provided with a first connection portion, and a second side portion of the transmission structure opposite to the first side portion is provided with a second connection portion, and
the two transmission structures provided to surround the adjacent shafts respectively are rotatably connected by means of the first connection portion and the second connection portion.

4. An electronic device, comprising:
a first body;
a second body; and
a flexible connection device, configured to connect the first body and the second body, and comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto the first body and/or the second body so that relative positions of the first body and the second body are changed, the N shafts and the N−1 transmission structures are driven sequentially so that the flexible connection device is flexibly bent, wherein the flexible connection device further comprises N/2 holding structures, each of which comprises a first clamping portion and a second clamping portion;
and wherein the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

5. The electronic device as claimed in claim 2, wherein the flexible connection device further comprises N/2 holding structures, each of which comprises a first clamping portion and a second clamping portion;
the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

6. The electronic device as claimed in claim 3, wherein the flexible connection device further comprises N/2 holding structures, each of which comprises a first clamping portion and a second clamping portion;
the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

7. The electronic device as claimed in claim 1, wherein the flexible connection device further includes:
a first body connection structure, configured to connect the first body and one of the first shaft and the $N^{th}$ shaft; and
a second body connection structure, configured to connect the second body and the other one of the first shaft and the $N^{th}$ shaft.

8. A flexible connection device, comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto a first body and/or a second body connected by the flexible connection device so that relative positions of the first body and the second body are changed, the N shafts and the N−1 transmission structures are driven sequentially so that the flexible connection device is flexibly bent,
wherein the transmission structure is provided with a first through hole and a second through hole;
wherein a first inner diameter of the first through hole is larger than a first outer diameter of the shaft, so that the shaft is rotatable in the first through hole;
wherein a second inner diameter of the second through hole is matched with the first outer diameter, so that the shaft is fixed in the second through hole;
wherein the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, and wherein i is an integer between 1 and N−1, and j is an integer between 1 and N−2.

9. A flexible connection device, comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto a first body and/or a second body connected by the flexible connection device so that relative positions of the first body and the second body are changed, the N shafts and the N−1 transmission structures are driven sequentially so that the flexible connection device is flexibly bent,
wherein the transmission structure is provided with a first through hole and a second through hole;
wherein a first inner diameter of the first through hole is larger than a first outer diameter of the shaft, so that the shaft is rotatable in the first through hole;
wherein a second inner diameter of the second through hole is matched with the first outer diameter, so that the shaft is fixed in the second through hole;
wherein the second through hole of $j-1^{th}$ transmission structure and the first through hole of $j^{th}$ transmission structure are provided to surround the $i^{th}$ shaft, and the second through hole of the $j^{th}$ transmission structure and the first through hole of the $j+1^{th}$ transmission structure are provided to surround the $i+1^{th}$ shaft, wherein i is an integer between 1 and N−1, and j is an integer between 1 and N−2,
wherein the transmission structure comprises a first sub-fixing point and a second sub-fixing point, provided on a first surface of the transmission structure; and
wherein the first sub-fixing point and the second sub-fixing point are used to connect and fix the two transmission structures provided to surround the same shaft, so that the shaft rotates with the first sub-fixing point and the second sub-fixing point as a rotating center.

10. The flexible connection device as claimed in claim 9, wherein a first side portion of the transmission structure is provided with a first connection portion, and a second side portion of the transmission structure opposite to the first side portion is provided with a second connection portion, and
the two transmission structures provided to surround the adjacent shafts respectively are rotatably connected by means of the first connection portion and the second connection portion.

11. A flexible connection device, comprising:
N shafts; and
N−1 transmission structures, wherein each of the transmission structures connects two adjacent shafts, to connect the N shafts together in order, wherein N is an integer which is larger than 3 or equals to 3;
wherein when an action force is applied onto a first body and/or a second body connected by the flexible connection device so that relative positions of the first body and the second body are changed, the N shafts and the N−1 transmission structures are driven sequentially so that the flexible connection device is flexibly bent, wherein the flexible connection device further comprises N/2 holding structures, each of which comprises a first clamping portion and a second clamping portion;

and wherein the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

12. The flexible connection device as claimed in claim 9, wherein the flexible connection device further comprises N/2 holding structures, each of which comprises a first clamping portion and a second clamping portion;

the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

13. The flexible connection device as claimed in claim 10, wherein the flexible connection device further comprises N/2 holding structures, each of which comprises a first clamping portion and a second clamping portion;

the first clamping portion of the $y^{th}$ holding structure clamps the $i^{th}$ shaft and the second clamping portion of the $y^{th}$ holding structure clamps the $i-1^{th}$ shaft, wherein y is an integer between 1 and N/2.

14. The flexible connection device as claimed in claim 8, wherein the flexible connection device further includes:

a first body connection structure, configured to connect the first body and one of the first shaft and the $N^{th}$ shaft; and a second body connection structure, configured to connect the second body and the other one of the first shaft and the $N^{th}$ shaft.

* * * * *